United States Patent
Kobayashi et al.

(10) Patent No.: US 7,732,729 B2
(45) Date of Patent: Jun. 8, 2010

(54) LASER PROCESSING DEVICE

(75) Inventors: Yutaka Kobayashi, Tokyo (JP); Kouichi Nehashi, Tokyo (JP); Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 371 days.

(21) Appl. No.: 11/822,972

(22) Filed: Jul. 11, 2007

(65) Prior Publication Data

US 2008/0011722 A1    Jan. 17, 2008

(30) Foreign Application Priority Data

Jul. 14, 2006    (JP)    .............................. 2006-193904

(51) Int. Cl.
*B23K 26/36*    (2006.01)
(52) U.S. Cl. ................... 219/121.62; 219/121.8
(58) Field of Classification Search ............ 219/121.68, 219/121.7, 121.71, 121.82, 121.83; 700/121.81
See application file for complete search history.

(56) References Cited

U.S. PATENT DOCUMENTS 4,543,464 A * 9/1985 Takeuchi ............... 219/121.68

2001/0040151 A1 * 11/2001 Isaji et al. .............. 219/121.71
2006/0201920 A1    9/2006 Morikazu et al.

FOREIGN PATENT DOCUMENTS

| JP | 6-120334 | 4/1994 |
| JP | 2002-192367 | 7/2002 |
| JP | 2003-163323 | 6/2003 |
| JP | 2003-320466 | 11/2003 |
| JP | 2006-247674 | 9/2006 |

* cited by examiner

*Primary Examiner*—Tu B Hoang
*Assistant Examiner*—Thien Tran
(74) *Attorney, Agent, or Firm*—Wenderoth, Lind & Ponack, L.L.P.

(57) ABSTRACT

A laser processing device capable of recognizing a failure of pulsed laser beam irradiation during a process of pulsed laser beam irradiation and taking appropriate measures. A first judgment section and a second judgment section monitor respectively whether a pulsed laser beam is actually irradiated by an oscillation of a laser oscillator at the timing when a pulse signal is output from a pulse signal output section and whether the pulse signal output section outputs the pulse signal as setting to the laser oscillator at the timing when the pulse signal is output based on the preset pulse number. When there is a failure of the pulsed laser beam irradiation during the processing, the occurrence of failure is recognized and it can be recognized whether the failure is caused by a laser beam irradiating unit or a controller including the pulse signal output section.

8 Claims, 7 Drawing Sheets

LASER PROCESSING DEVICE

BACKGROUND OF THE INVENTION

1. Field of the Invention

The present invention relates to a laser processing device for processing a workpiece by irradiating a workpiece such as a semiconductor wafer with a pulsed laser beam.

2. Related Art

A wafer on which a plurality of devices such as IC and LSI are formed while being partitioned by predetermined division lines is divided into individual devices by a dicing device or a laser processing device to be used for electronic instruments such as mobile phone and a personal computer.

The thickness of wafer is set to be thin, such as about 100 μm to 50 μm, so as to achieve reduction in size and weight of an electronic device while a via hole (through hole) is perforated and provided on the rear surface of a bonding pad of device (for example, refer to JP-A-2003-163323). In the technology in JP-A-2003-163323, a fine via hole is formed by a drill, which is poor in productivity. Consequently, a technology of perforating and providing a via hole on the rear surface of the bonding pad of the device by a laser processing device has been devised and a patent application thereof is filed by the applicant of the invention as seen in JP-A-2006-247674 (corresponding to US 20060201920)

There are some laser processing devices for removing a low-dielectric-constant insulating film (Low-k film) laminated on predetermined division lines by irradiating the predetermined division lines of wafer with a laser beam, forming division grooves, and forming affected layers inside the predetermined division lines by irradiating the wafer with a laser beam having a wavelength with optical transparency (for example, refer to JP-A-2003-320466; JP-A-6-120334; JP-A-2002-192367), as well as perforating and providing the via hole.

However, in the case of perforating and providing a via hole by irradiating with a laser beam, although the position of laser beam irradiation is controlled by an X-Y-axis coordinate value to irradiate with a pulsed laser beam at a predetermined number, the laser beam is not sufficiently irradiated to leave the part that does not function as a via hole.

Also in the case of removing a low-dielectric-constant insulating film (Low-k film) by laser beam irradiation or forming division grooves and affected layers, the low-dielectric-constant insulating film is not properly removed due to discontinuous pulsed laser beam irradiation or a wafer is not property divided due to intermittent formation of the division grooves or the affected layers.

Such problems arise in the case where a laser beam irradiating unit does not irradiate with a pulsed laser beam at a preset pulse number actually or in the case where energy of pulsed laser beam per pulse is not uniform. In the conventional technique, the failure of laser processing device is recognized by checking the processed wafer to sacrifice the wafer, which is not economical.

SUMMARY OF THE INVENTION

The invention has been achieved in view of the aforementioned problems and an object of the invention is to provide a laser processing device capable of recognizing a failure of pulsed laser beam irradiation during the process of pulsed laser beam irradiation and taking appropriate measures.

To solve the problems and achieve the above object, a laser processing device of the invention is comprised of a chuck table for holding a workpiece; a laser beam irradiating unit for irradiating the workpiece held on the chuck table with a pulsed laser beam; a controller for controlling the laser beam irradiating unit; a processing feed unit for relatively feeding the chuck table and the laser beam irradiating unit in an X-axis direction as a processing feed direction to output an X-axis coordinate value; and an indexing feed unit for relatively feeding the chuck table and the laser beam irradiation unit in a Y-axis direction as an indexing feed direction to output a Y-axis coordinate value, wherein the laser beam irradiating unit includes a laser oscillator; and an irradiation unit for irradiating the workpiece with the pulsed laser beam oscillated by the laser oscillator, and the controller includes: a pulse number setting section for setting a pulse number; a pulse signal output section for outputting a pulse signal to the laser oscillator according to the pulse number set in the pulse number setting section; a pulse signal detector for detecting the pulse signal output from the pulse signal output section; a pulsed laser beam detector for detecting the pulsed laser beam by branching a part of the pulsed laser beam oscillated by the laser oscillator to be received by a photodetector; a first judgment section for judging whether a timing detected by the pulse signal detector and a timing detected by the pulsed laser beam detector match each other after comparing the timings and outputting an abnormal signal in the case of not matching; and a second judgment section for judging whether a timing based on the value set by the pulse number setting section and the timing detected by the pulse signal detector match each other after comparing the timings and outputting an abnormal signal in the case of not matching.

The controller may include an output judgment section for judging whether an output of the pulsed laser beam falls within a predetermined level by detecting the pulsed laser beam after branching a part of the pulsed laser beam oscillated by the laser oscillator to be received by the photodetector and outputting an abnormal signal in the case of not falling within the predetermined level.

Further, the controller may include a coordinate storage for storing an X-coordinate value and a Y-coordinate value of the workpiece with the abnormal signal output by checking: the X-axis coordinate value output from an X-coordinate value output section by the processing feed unit; the Y-axis coordinate value output from a Y-coordinate value output section by the indexing feed unit; the abnormal signal output from the first judgment section; the abnormal signal output from the second judgment section; and the abnormal signal output from the output judgment section.

According to the laser processing device of the invention, the first judgment section checks whether the pulsed laser beam irradiation is property performed or not by comparing the timing of the pulse signal output from the pulse signal output section and the output timing of the pulsed laser beam actually output by the oscillation of the laser oscillator. The second judgment section checks whether the pulse signal is output to the laser oscillator as preset or not by comparing the timing based on the preset pulse number and the timing of the pulse signal output from the pulse signal output section. Accordingly, when there is a failure of the pulsed laser beam irradiation during the process of the pulsed laser beam irradiation, the occurence of failure can be recognized and it can be recognized whether the failure is caused by the laser beam irradiating unit or by the controller including the pulse signal output section. Based on the recognition result, for example, appropriate measures can be taken, such as reprocessing the part of failure.

According to the laser processing device of the invention, in addition, a part of pulsed laser beam actually subject to irradiation is monitored by the photodetector to judge whether the level of pulse energy falls within the predetermined range or not. Accordingly, in the case of fatal failure of the pulsed laser beam irradiation beyond the predetermined range, a damage of workpiece can be minimized by stopping the following processing.

Further, according to the laser processing device of the invention, when a failure occurs in the pulsed laser beam irradiation, the X-axis coordinate value and the Y-axis coordinate value at the failure of processing the workpiece are stored. Accordingly, the reprocessing of the part of failure can be facilitated to avoid the damage of workpiece.

DETAILED DESCRIPTION OF THE PREFERRED EMBODIMENTS

Hereinafter, preferred embodiment of the laser processing device will be described in reference to drawings. The laser processing device according to this embodiment is applied to a processing device for forming a via hole (through hole) by multiple pulsed laser beam irradiations to the rear surface of bonding pads of devices on a wafer.

Figure 1:
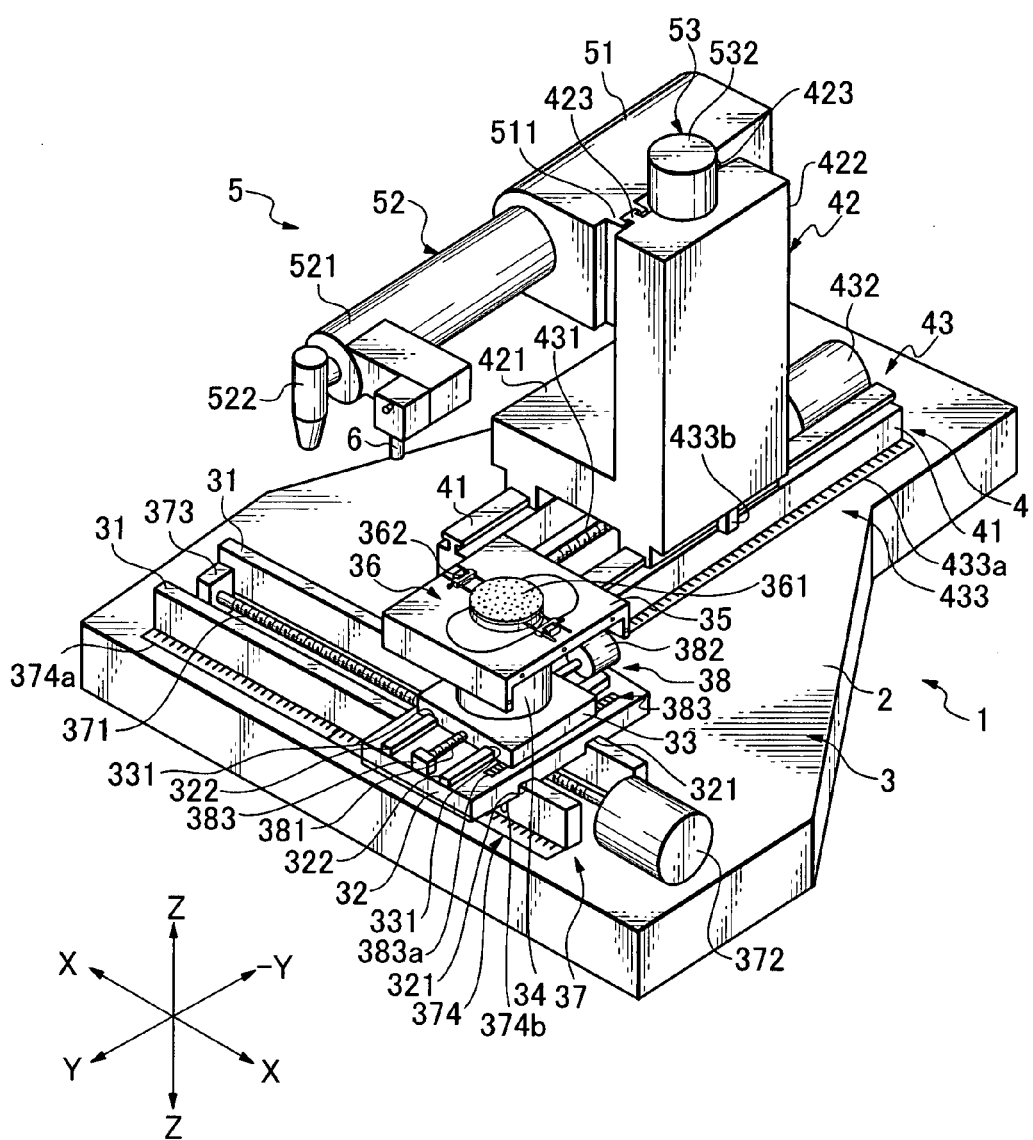
FIG. 1 is an outline perspective view showing a main part of a laser processing device according to an embodiment.

FIG. 1 is an outline perspective view showing a main part of the laser processing device according to this embodiment A laser processing device 1 in this embodiment is configured by a stationary base 2, a chuck table mechanism 3 for holding a workpiece by being movably arranged on the stationary base 2 in an X-axis direction as a processing feed direction, a laser beam irradiation unit support mechanism 4 movably arranged on the stationary base 2 in a Y-axis direction as an indexing feed direction orthogonal to the X-axis direction, and a laser beam irradiation unit 5 arranged on the laser beam irradiation unit support mechanism 4 movably in a Z-axis direction.

The chuck table mechanism 3 is configured by a pair of guide rails 31 arranged on the stationary base 2 in parallel to each other along the X-axis direction as the processing feed direction, a first sliding block 32 movably arranged on the guide rails 31 in the X-axis direction; a second sliding block 33 movably arranged on the first sliding block 32 in the Y-axis direction as the indexing feed direction, a support table 35 supported by a cylindrical member 34 on the second sliding block 33, and a chuck table 36. The chuck table 36 includes an absorption chuck 361 formed by porous material, which holds the workpiece on the absorption chuck 361 by a suction means and is rotatable by a pulse motor (not shown) arranged in the cylindrical member 34. It should be noted that the chuck table 36 has a damp 362 for fixing a circular frame described later.

The first sliding block 32 is provided with a pair of guided grooves 321 fit to the pair of guide rails 31 thereunder and with a pair of guide rails 322 formed in parallel to each other thereon along the Y-axis direction. The first sliding block 32 thus configured is movable in the X-axis direction along the pair of guide rails 31 with the guided grooves 321 fit to the guide rails 322.

The chuck table mechanism 3 has a processing feed unit 37 for moving the first sliding block 32 along the pair of guide rails 31 in the X-axis direction. The processing feed unit 37 includes a male screw rod 371 arranged in parallel between the pair of guide rails 31, and a driving source such as a pulse motor 372 for performing a rotary drive on the male screw rod 371. An end of the male screw rod 371 is rotatably supported at a bearing block 373 fixed on the stationary base 2 while the other end thereof is transmissively connected to an output axis of the pulse motor 372. It should be noted that the male screw rod 371 is screwed into a through female screw hole formed at a female screw block (not shown) provided protruded to the lower surface of the central part of the first sliding block 32 and the male screw rod 371 is driven by the pulse motor 372 by normal and reverse rotations. Thereby the first sliding block 32 is subject to the processing feed in the X-axis direction along the guide rails 31.

The processing feed unit 37 includes a processing feed amount detector 374 for detecting a processing feed amount of the chuck table 36 to output the X-axis coordinate value thereof. The processing feed amount detector 374 is configured by an X-axis linear scale 374a arranged along the guide rails 31, an X-axis reading head 374b arranged at the first sliding block 32 and moving along the X-axis linear scale 374a together with the first sliding block 32, and an X-coordinate value output section 374c (refer to FIG. 2) for outputting the X-axis coordinate value as the result of reading out by the X-axis reading head 374b to a controller described later. In this embodiment, the X-axis reading head 374b outputs a pulse signal at 1 pulse for 1 μm to the X-coordinate value output section 374c. The X-coordinate value output section 374c detects the processing feed amount of the chuck table 36 by counting the pulse signal and converting to the X-axis coordinate value to output to the controller.

The second sliding block 33 is provided with a pair of guided grooves 331 fit to the pair of guide rails 322 provided on the upper surface of the first sliding block 32 thereunder and an indexing feed can be performed in the Y-axis direction by fitting those guided grooves 331 to the pair of guide rails 322. The chuck table mechanism 3 has a first indexing feed unit 38 for performing the indexing feed on the second sliding block 33 along the pair of guide rails 322 provided in the first sliding block 32 in the Y-axis direction. The first indexing feed unit 38 includes a male screw rod 381 arranged in parallel between the pair of guide rails 322, and a driving source such as a pulse motor 382 for performing a rotary drive on the male screw rod 381. An end of the male screw rod 381 is rotatably supported at a bearing block 383 fixed on the first sliding block 32 while the other end thereof is transmissively connected to an output axis of the pulse motor 382. It should be noted that the male screw rod 381 is screwed into a through female screw hole formed at a female screw block (not shown) provided protruded to the lower surface of the central part of the second sliding block 33 and the male screw rod 381 is driven by the pulse motor 382 by normal and reverse rotations. Thereby the second sliding block 33 is subject to the processing feed in the Y-axis direction along the guide rails 322.

The first indexing feed unit 38 includes a first indexing feed amount detector 383 for detecting an indexing feed amount of the chuck table 36 (second sliding block 33) to output the Y-axis coordinate value thereof. The first indexing feed amount detector 383 is configured by a first Y-axis linear scale 383a arranged along the guide rails 322, a first Y-axis reading head 383b (refer to FIG. 2) arranged at the second sliding block 33 and moving along the first Y-axis linear scale 383a together with the second sliding block 33, and a Y-coordinate value output section 383c (refer to FIG. 2) for outputting the Y-axis coordinate value as the result of reading out by the Y-axis reading head 383b to the controller described later. In this embodiment, the first Y-axis reading head 383b outputs a pulse signal at 1 pulse for 1 μm to the Y-coordinate value output section 383c.

The laser beam irradiation unit support mechanism 4 is configured by a pair of guide rails 41 arranged on the stationary base 2 in parallel to each other along the Y-axis direction, and a movable support base 42 movably arranged on the guide rails 41 in the Y-axis direction. The movable support base 42 is configured by a movable supporting part 421 movably arranged on the guide rails 41 and an applied part 422 attached to the movable supporting part 421. The applied part 422 has a pair of guide rails 423 extending in a Z-axis direction arranged in parallel on one side. The laser beam irradiation unit support mechanism 4 has a second indexing feed unit 43 for performing the indexing feed on the movable support base 42 along the pair of guide rails 41 in the Y-axis direction. The second indexing feed unit 43 includes a male screw rod 431 arranged in parallel between the pair of guide rails 41, and a driving source such as a pulse motor 432 for performing a rotary drive on the male screw rod 431. An end of the male screw rod 431 is rotatably supported at a bearing block (not shown) fixed on the stationary base 2 while the other end thereof is transmissively connected to an output axis of the pulse motor 432. It should be noted that the male screw rod 431 is screwed into a through female screw hole formed at a female screw block (not shown) provided protruded to the lower surface of the central part of the movable supporting part 421 configuring the movable support base 42 and the male screw rod 431 is driven by the pulse motor 432 by normal and reverse rotations. Thereby the movable support base 42 is subject to the indexing feed in the Y-axis direction along the guide rails 41.

The laser beam irradiation unit support mechanism 4 includes a second indexing feed amount detector 433 for detecting an indexing feed amount of the movable support base 42 to output the Y-axis coordinate value thereof. The second indexing feed amount detector 433 is configured by a second Y-axis linear scale 433a arranged along the guide rails 41, a second Y-axis reading head 433b arranged at the movable support base 42 and moving along the second Y-axis linear scale 433a, and a Y-coordinate value output section 383c (refer to FIG. 2) for outputting the Y-axis coordinate value as the result of reading out by the second Y-axis reading head 433b to a controller described later. In this embodiment, the second Y-axis reading head 433b outputs a pulse signal at 1 pulse for 1 μm to the Y-coordinate value output section 383c. The Y-coordinate value output section 383c detects the indexing feed amount of the chuck table 36 or the laser beam irradiation unit 5 by counting the pulse signal output from the first Y-axis reading head 383b or the second Y-axis reading head 433b and converting to the Y-axis coordinate value to output to the controller. For this reason, the first Y-axis linear scale 383a and the second Y-axis linear scale 433a are arranged correlated to each other and the indexing location (Y-axis coordinate value) is specified based on the pulse signals output from the first Y-axis reading head 383b and the second Y-axis reading head 433b.

The laser beam irradiation unit 5 is provided with a unit holder 51 and a laser beam irradiating unit 52 attached to the unit holder 51. The unit holder 51 is provided with a pair of guided grooves 511 slidably fit to the pair of guide rails 423 provided at the applied part 422 and the guided grooves 511 are movably supported in the Z-axis direction by fitting those guided grooves 511 to the pair of guide rails 423.

Figure 2:
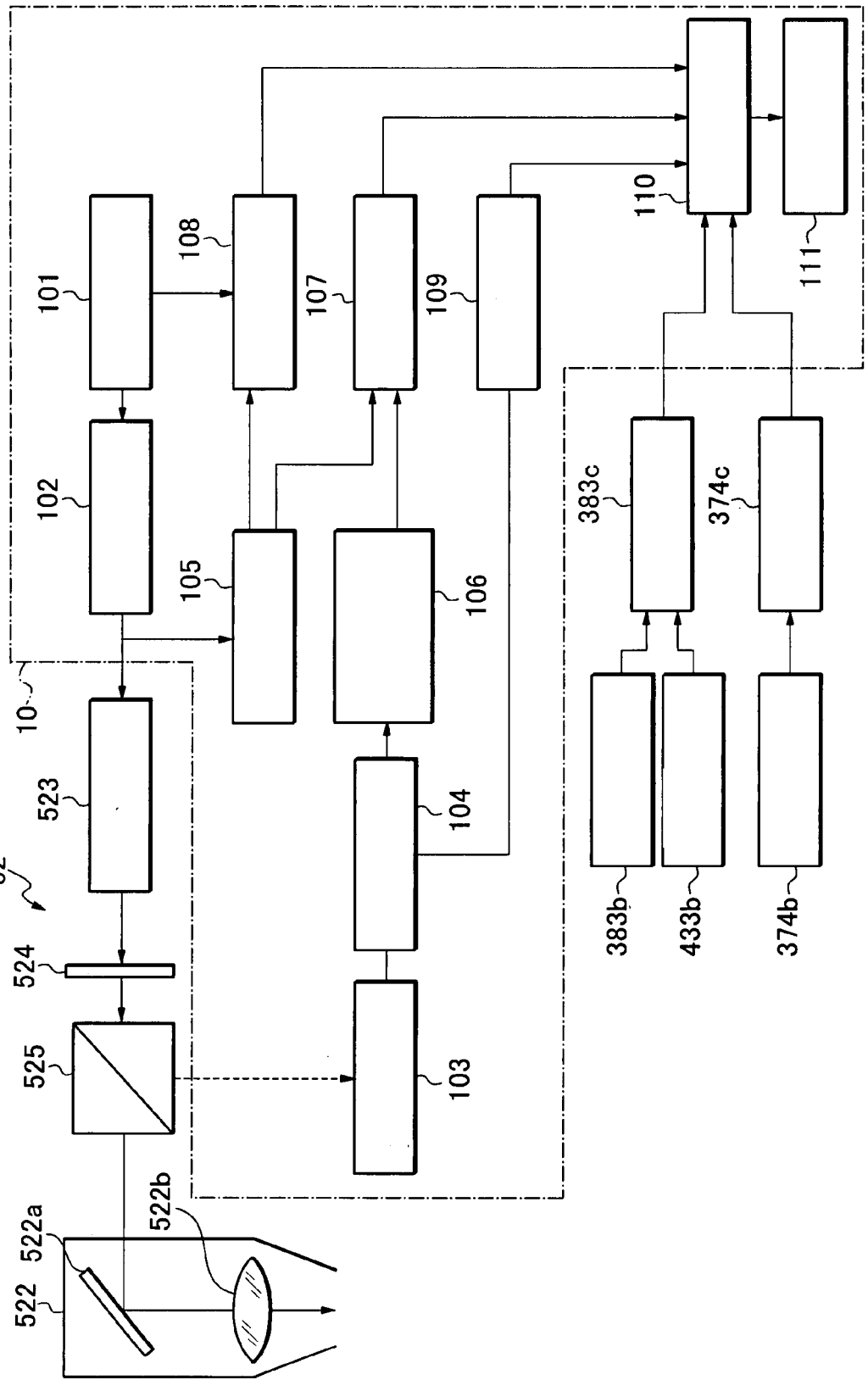
FIG. 2 is a block diagram mainly showing a configuration example of a controller.

The laser beam irradiating unit 52 irradiates with a pulsed laser beam from an irradiation unit 522 attached to the distal end of a cylindrical casing 521 arranged substantially horizontally. In addition as shown in FIG. 2, the laser beam irradiating unit 52 includes a laser oscillator 523 such as YAG laser and YVO4 laser, a wavelength plate 524 for adjusting incident angles of P wave and S wave included in the pulsed laser beam oscillated by the laser oscillator 523, and a polarization beam splitter 525 for branching P wave component and S wave component included in the pulsed laser beam with the incident angles adjusted after transmitting the wavelength plate 524. The irradiation unit 522 includes a deflecting mirror 522a, a collecting lens 522b and the like.

An imaging unit 6 is arranged at the anterior end of the casing 521 to detect the area to be subject to laser processing by the laser beam irradiating unit 52. The imaging unit 6 includes a lighting unit for lighting a workpiece, an optical system for capturing the area lighted by the lighting unit, an imaging device (CCD) for imaging the image captured by the optical system and the like, and sends the imaged image signal to the controller (not shown).

The laser beam irradiation unit 5 has a moving unit 53 for moving the unit holder 51 along the pair of guide rails 423 in the Z-axis direction. The moving unit 53 includes a male screw rod (not shown) arranged between the pair of guide rails 423, and a driving source such as a pulse motor 532 for performing a rotary drive on the male screw rod and the male screw rod (not shown) is driven by the pulse motor 532 by normal and reverse rotations. Thereby the unit holder 51 and the laser beam irradiating unit 52 are moved in the Z-axis direction along the guide rails 423.

The laser processing device 1 includes a controller 10 for controlling the laser beam irradiating unit 52. FIG. 2 is a block diagram mainly showing a configuration example of the controller 10. The controller 10 includes a pulse number setting section 101, a pulse signal output section 102, a photodetector 103, an A/D converter 104, a pulse signal detector 105, a pulsed laser beam detector 106, a first judgment section 107, a second judgment section 108, an output judgment section 109, a check section 110, and a coordinate storage 111.

In the pulse number setting section 101, there is set in advance the pulse number of the pulsed laser beam to perform irradiation for forming individual via hole together with the timing thereof (repetition frequency) in forming the via hole by irradiating a device with the pulsed laser beam. The pulse signal output section 102 is for outputting a pulse signal for driving to the laser oscillator 523 according to the pulse number set in the pulse number setting section 101. The photodetector 103 is a light receiving element for receiving a part (for example, approximate 1%) of the pulsed laser beam branched in the polarization beam splitter 525. The pulse signal detector 105 is for detecting the pulse signal to be actually output to the laser oscillator 523 by the pulse signal output section 102. The pulsed laser beam detector 106 is for detecting the pulsed laser beam actually irradiated from the laser oscillator 523 configured by A/D conversion in the A/D converter 104 after branching a part of the pulsed laser beam oscillated by the laser oscillator 523 in the polarization beam splitter 525 to be received in the photodetector 103.

The first judgment section 107 judges whether a timing when the pulse signal has been detected by the pulse signal detector 105 and a timing of the pulsed laser beam detected by the pulsed laser beam detector 106 match each other after comparing the timings, and in the case of not matching outputs an abnormal signal indicating that a pulsed laser beam irradiation omission is caused by the laser beam irradiating unit 52. The second judgment section 108 judges whether a timing of the pulse signal based on the value preset by the pulse number setting section 101 and the timing when the pulse signal has been detected by the pulse signal detector 105 match each other after comparing the timings, and in the case of not matching outputs an abnormal signal indicating that the pulse signal omission is caused by the controller 10 including the pulse signal output section 102. The output judgment section 109 judges whether an output value indicating the level of the pulsed laser beam which has been received by the photodetector 103 and on which an A/D conversion has been performed by the A/D converter 104 falls within a preset threshold value (lower limit THL, upper limit THH), and in the case of not falling within the predetermined level outputs an abnormal signal indicating there is a failure of output intensity of the irradiated pulsed laser beam.

The check section 110 makes a coordinate storage 111 store the X-axis coordinate value output from the X-coordinate value output section 374c and the Y-axis coordinate value output from the Y-coordinate value output section 383c together with the type of abnormal signal so as to specify the processing location at the time of outputting the abnormal signal when the abnormal signal is output from the first judgment section 107, the second judgment section 108 or the output judgment section 109.

Figure 3:
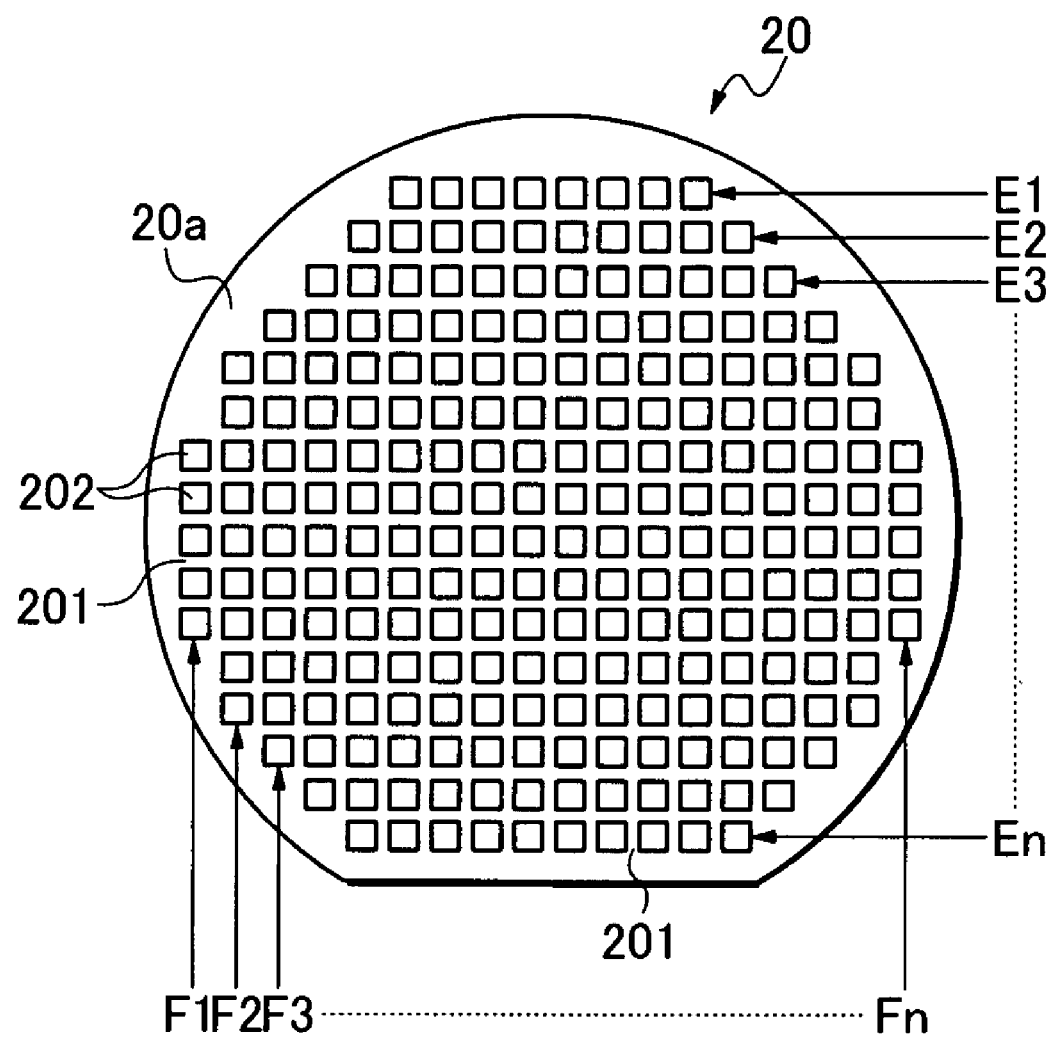
FIG. 3 is a plan view of a configuration example of a workpiece used in the laser processing device according to the embodiment.
Figure 4:
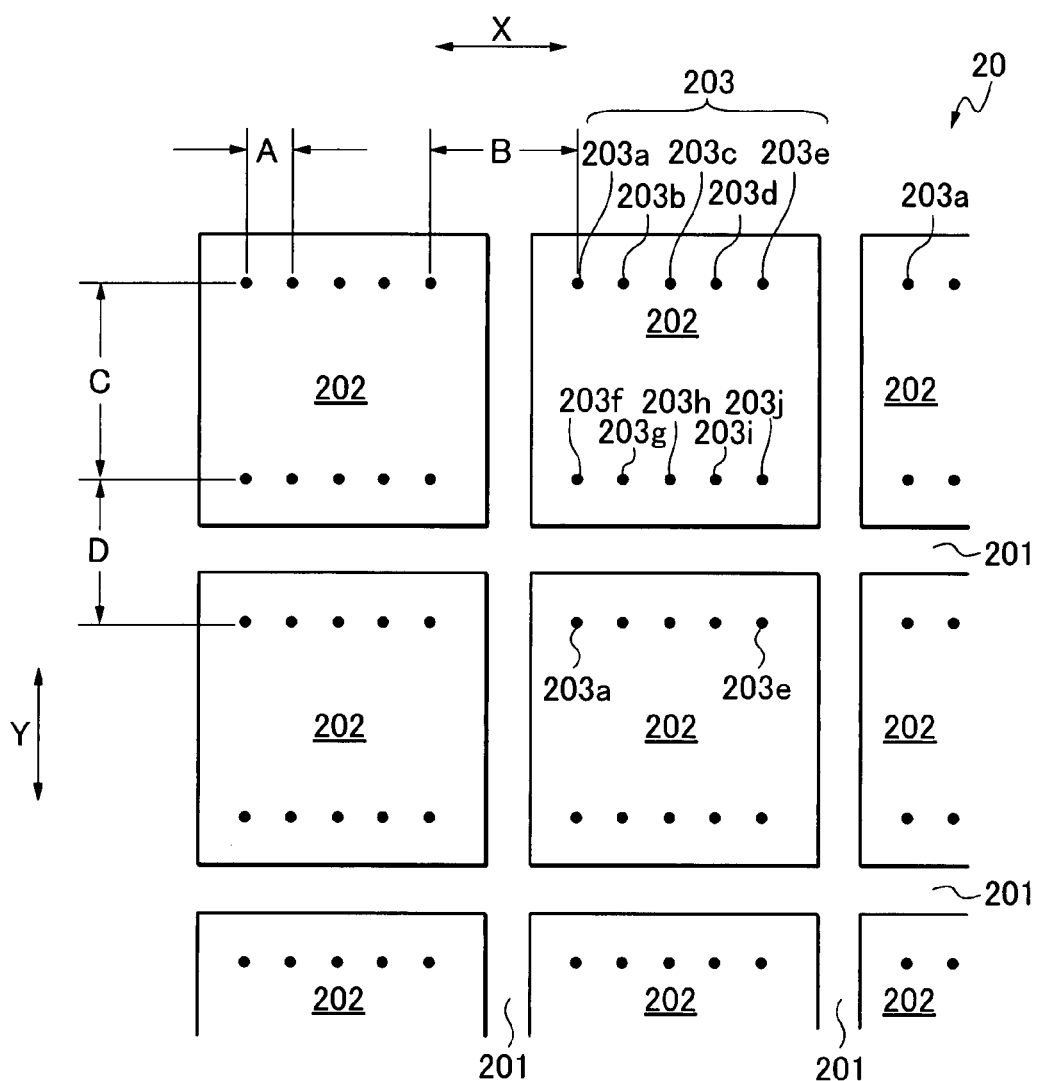
FIG. 4 is a plan view showing the workpiece partially enlarged.

FIG. 3 is a plan view of a configuration example of a workpiece 20 used in the laser processing device 1 according to this embodiment. The workpiece 20 is, for example, a semiconductor wafer and has a plurality of areas partitioned by a plurality of predetermined division lines 201 arranged in a lattice-like manner on a surface 20a thereof and devices 202 such as IC and LSI are formed respectively in the partitioned area. Each of the devices 202 has the same configuration. In addition, a plurality of electrodes 203 (203a-203j) is formed on the surface of the devices 202 as shown in FIG. 4. In this embodiment, the electrodes 203a, 203f, the electrodes 203b, 203g, the electrodes 203c, 203h, the electrodes 203d, 203i and the electrodes 203e, 203j are set for the locations in the X-axis direction to be the same. Via holes (through holes) are formed on these electrodes 203 (203a-203j).

Intervals A in the X-axis direction (horizontal direction in FIG. 4) of the electrodes 203 (203a-203j) in each of the devices 202 and intervals B between the electrodes adjacent to each other in the X-axis direction across the predetermined division lines 201 in the electrodes 203 formed in each of the devices 202, in other words, between the electrodes 203e and 203a are set to have the same intervals respectively. Intervals C in the Y-axis direction (vertical direction in FIG. 4) of the electrodes 203 in each of the devices 202 and intervals D between the electrodes adjacent to each other in the Y-axis direction across the predetermined division lines 201 in the electrodes 203 formed in each of the devices 202, in other words, between the electrodes 203f and 203a are set to have the same intervals respectively With regard to the workpiece 20 configured by semiconductor wafer thus configured, the number of devices arranged in each of rows E1, E2, . . . , En and each of columns F1, F2, . . . , Fn and the intervals A, B, C and D have the data of design value thereof stored in a storing part (not shown).

In the laser processing device 1 as such, there will be described the way of forming a via hole on the electrodes 203 (203a-203j) of each of the devices 202 formed at the workpiece 20 by laser processing.

Figure 5:
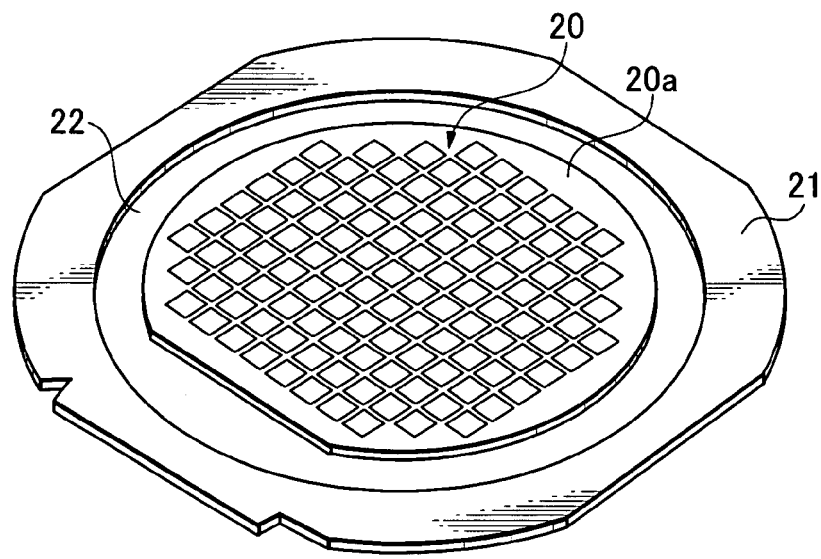
FIG. 5 is a perspective view showing a state of sticking the workpiece to a surface of a protective tape attached to a circular frame.

The workpiece 20 thus configured is stuck with a surface 20a up to a protective tape 22 made of synthetic resin such as polyolefin attached at a circular frame 21 as shown in FIG. 5. The workpiece 20 supported on the circular frame 21 through the protective tape 22 mounts the protective tape 22 on the chuck table 36 of the laser processing device 1 shown in FIG. 1. The workpiece 20 is suctionally held on the chuck table 36 through the protective tape 22 by activating the suctioning means (not shown). The frame 21 is fixed by the clamp 362.

The chuck table 36 suctionally holding the workpiece 20 is located right under the imaging unit 6 by the processing feed unit 37. When the chuck table 36 is located right under the imaging unit 6, the workpiece 20 on the chuck table 36 is to be located at a coordinate location shown in FIG. 6. In this state, an alignment is performed to determine whether the lattice-like arranged predetermined division lines 201 formed in the workpiece 20 held on the chuck table 36 are arranged in parallel in the X- and Y-axis directions or not. In other words, the workpiece 20 held on the chuck table 36 is imaged by the imaging unit 6 to perform an image processing such as pattern matching and to perform the alignment.

Figure 6:
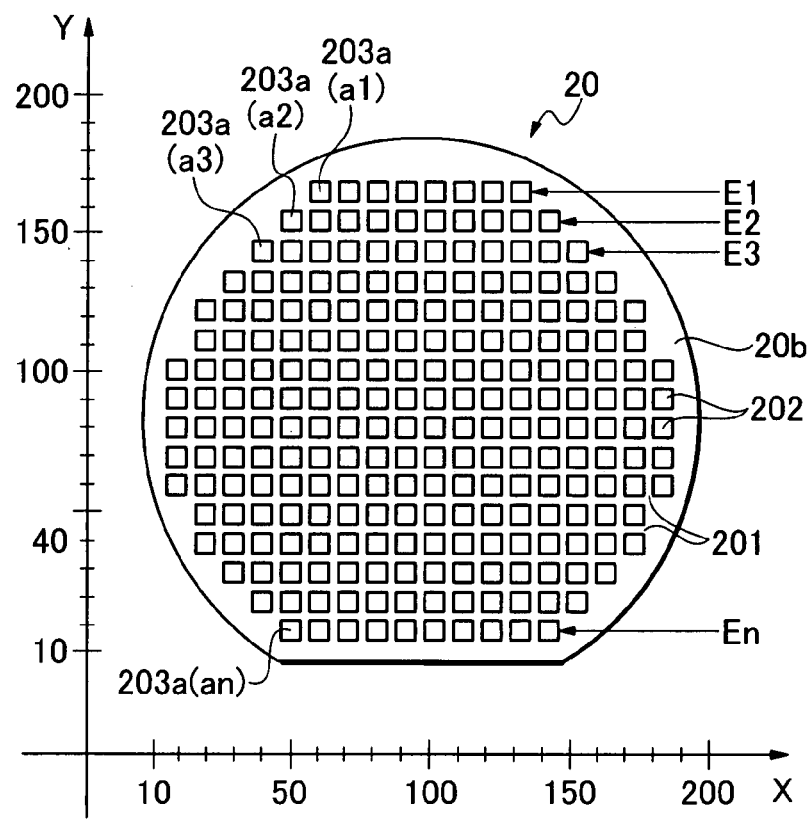
FIG. 6 is an explanatory diagram showing a relation to a coordinate in a state where the workpiece is held at a predetermined position of a chuck table.

Next, the chuck table 36 is moved to locate the leftmost device 202 of the highest-order row E1 in the devices 202 formed at the workpiece 20 in FIG. 6 right under the imaging unit 6. Then the upper left electrode 203a in FIG. 6 in the electrodes 203 (203a-203j) formed at the devices 202 is located right under the imaging unit 6. When the imaging unit 6 detects the electrode 203a in this state, a coordinate value (a1) thereof is sent to the controller (not shown) as a coordinate value of the location for starting a first processing feed. The controller (not shown) stores this coordinate value (a1) as the coordinate value of the location for starting the first processing feed in a memory (not shown). At this time, since the imaging unit 6 and the irradiation unit 522 are arranged at a predetermined interval in the X-axis direction, the value with the interval between the imaging unit 6 and the irradiation unit 522 added is stored as the X-axis coordinate value.

When detecting the coordinate value (a1) as the coordinate value of the location for starting the first processing feed in the device 202 of the highest-order row E1 in FIG. 6, the chuck table 36 is subject to the indexing feed in the Y-axis direction at the intervals of the predetermined division lines 201 and moved in the X-axis direction. Then the leftmost device 202 of a second row E2 from the highest in FIG. 6 is located right under the imaging unit 6 and the upper left electrode 203a in FIG. 6 in the electrodes 203 (203a-203j) formed at the devices 202 is located right under the imaging unit 6. When the imaging unit 6 detects the electrode 203a in this state, a coordinate value (a2) thereof is sent to the controller (not shown) as a coordinate value of the location for starting a second processing feed. The controller (not shown) stores this coordinate value (a2) as the coordinate value of the location for starting the second processing feed in a memory (not shown). At this time, since the imaging unit 6 and the irradiation unit 522 are arranged at a predetermined interval in the X-axis direction, the value with the interval between the imaging unit 6 and the irradiation unit 522 added is stored as the X-axis coordinate value.

Hereafter, the above-mentioned indexing feed and detection process of location for starting processing feed are repeated until reaching the lowest-order row En in FIG. 6 to detect coordinate values (a3-an) of the location for starting the processing feed in the devices 202 formed in each line, which are stored in the memory (not shown).

Figure 7A:
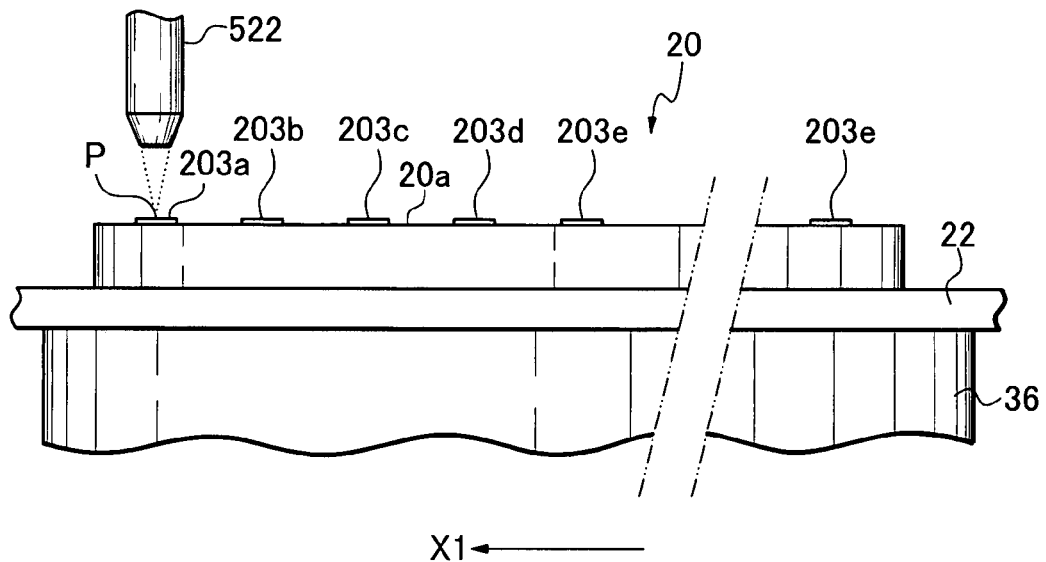
FIG. 7A is an explanatory diagram showing an initial state of perforating step carried out by the laser processing device.

Next, there is performed a perforating step for perforating via hole in the electrodes 203 (203a-203j) formed at the devices 202 of the workpiece 20. In the perforating step, the processing feed unit 37 is activated to move the chuck table 36 and to locate the coordinate value (a1) as the coordinate value of the location for starting the first processing feed stored in the memory right under the irradiation unit 522. FIG. 7A is an explanatory diagram showing the state of locating the coordinate value (a1) as the coordinate value of the location for starting the first processing feed stored in the memory right under the irradiation unit 522. In the state of FIG. 7A, the laser beam irradiating unit 52 is activated to control to irradiate from the irradiation unit 522 with the pulsed laser beam by one pulse and to control the processing feed unit 37 to perform processing feed on the chuck table 36 at a predetermined transfer rate in the direction indicated by an arrow X1 in FIG. 7A. Therefore, the part corresponding to the electrode 203a of the coordinate value (a1) as the coordinate value of the location for starting the first processing feed is irradiated with the pulsed laser beam by one pulse. A converging point P of the pulsed laser beam from the irradiation unit 522 is adjusted to be located near the surface 20a.

The controller (not shown) inputs a detected signal from the X-axis reading head 374b of the processing feed amount detector 374. This detected signal is counted by a counter (not shown). When the counted value reaches the value corresponding to the interval A in the X-axis direction in FIG. 4 in the electrodes 203, the laser beam irradiating unit 52 is activated to control to irradiate with the pulsed laser beam by one pulse from the irradiation unit 522. Then the controller (not shown) activates the laser beam irradiating unit 52 to control to irradiate with the pulsed laser beam by one pulse from the irradiation unit 522 every time the counted value by the counter reaches the intervals A and B in the X-axis direction.

Figure 7B:
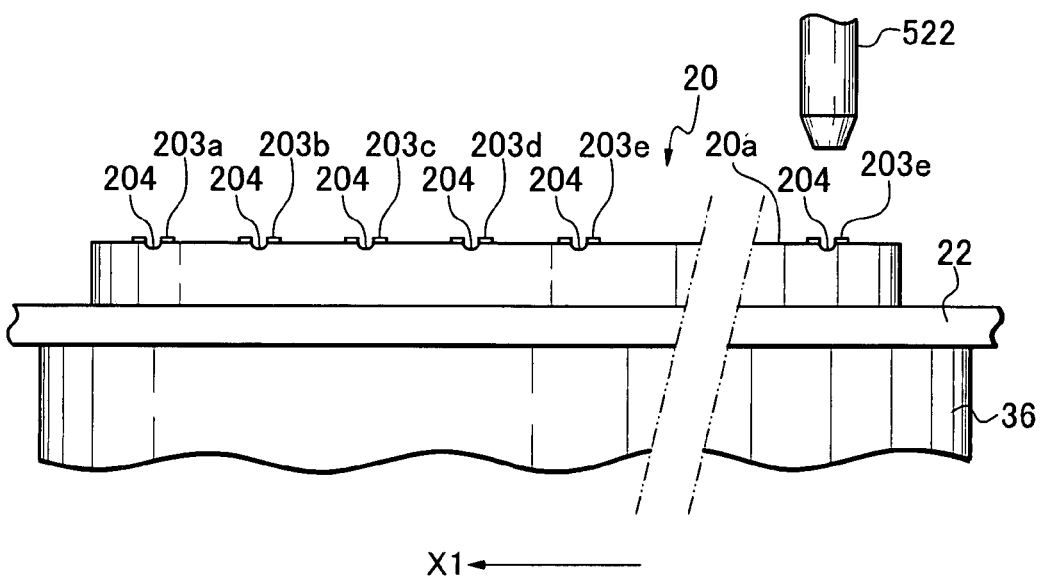
FIG. 7B is an explanatory diagram showing a state of forming a laser hole in the perforating step.

Then as shown in FIG. 7B, when the rightmost electrode 203j formed at the rightmost device 202 of the row E1 of the workpiece 20 reaches the irradiation unit 522, the laser beam irradiating unit 52 is activated to control to irradiate with the pulsed laser beam by one pulse from the irradiation unit 522. After that, the activation of the processing feed unit 37 is stopped to stop the movement of the chuck table 36. As a result as shown in FIG. 7B, laser holes 204 for via hole are formed at the parts of the electrodes 203 (not shown). The depth of the laser holes 204, which depends on processing condition, is, for example, approximate 5 μm.

Figure 8A:
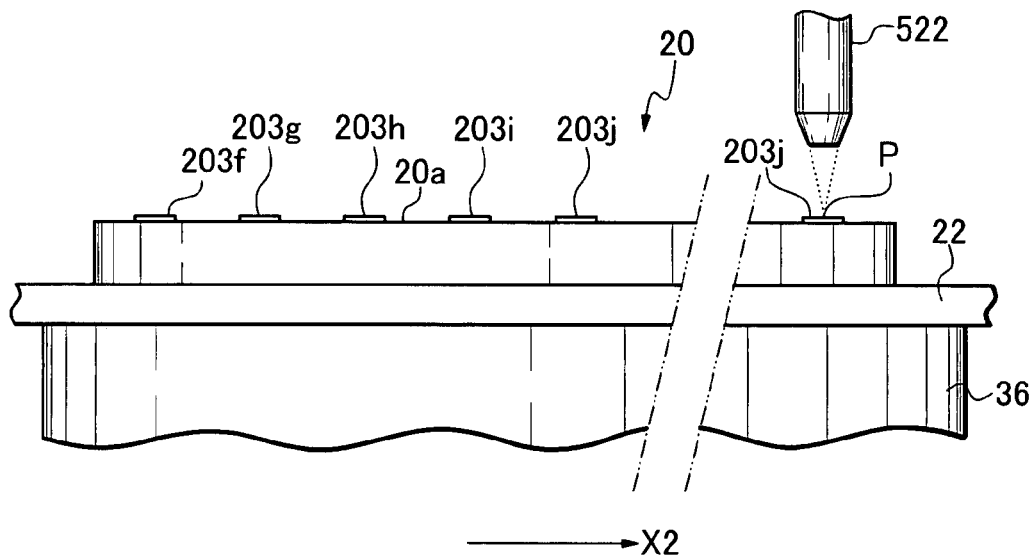
FIG. 8A is an explanatory diagram showing a halfway state of perforating step carried out by the laser processing device.

In the next, the controller (not shown) controls the second indexing feed unit 43 to perform indexing feed on the irradiation unit 522 of the laser beam irradiating unit 52 in a vertical direction to paper (front-back direction) in FIG. 7B. The controller also inputs a detected signal from the second Y-axis reading head 433b of the second indexing feed amount detector 433 and counts this detected signal by the counter (not shown). When the counted value reaches the value corresponding to the interval C in the Y-axis direction of the electrodes 203, the activation of the second indexing feed unit 43 is stopped to stop the indexing feed of the laser beam irradiating unit 52. As a result, the irradiation unit 522 is located right above the electrode 203j in the same column as the electrode 203e. FIG. 8A is an explanatory diagram showing this positioning state.

In the state of FIG. 8A, the controller (not shown) activates the laser beam irradiating unit 52 to control to irradiate with the pulsed laser beam by one pulse from the irradiation unit 522 and to control the processing feed unit 37 to perform processing feed on the chuck table 36 at a predetermined transfer rate in the direction indicated by an arrow X2 in FIG. 8A. Then the controller counts the detected signal from the X-axis reading head 374b in the processing feed amount detector 374 by the counter, and every time the counted value reaches the intervals A and B in the X-axis direction with regard to the electrodes 203 the laser beam irradiating unit 52 is activated to control to irradiate with the pulsed laser beam by one pulse from the irradiation unit 522.

Figure 8B:
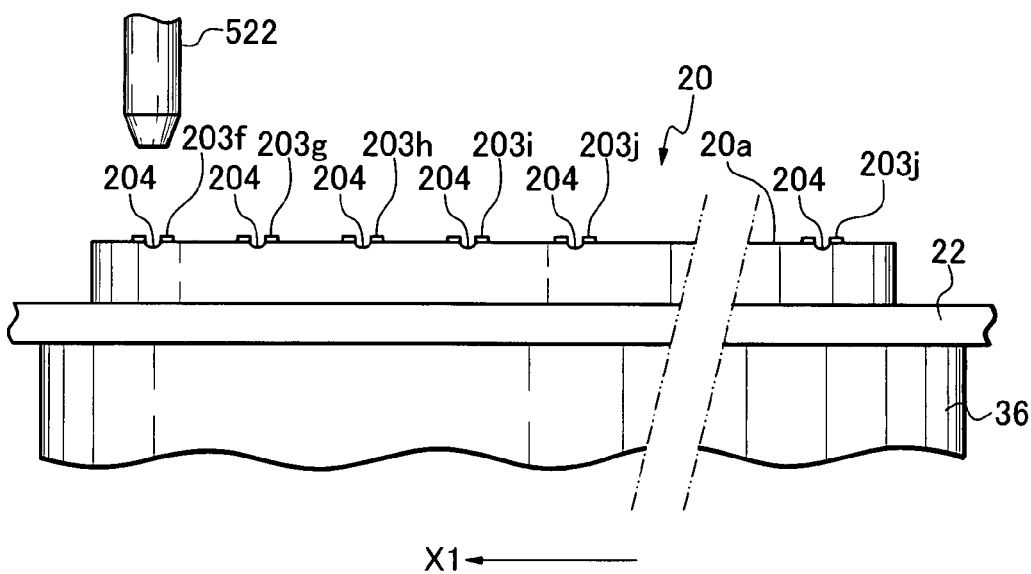
FIG. 8B is an explanatory diagram showing the state of forming the laser hole in the perforating step.

Then as shown in FIG. 8B, when the electrode 203j formed at the rightmost of the row E1 of the workpiece 20 reaches the irradiation unit 522, the laser beam irradiating unit 52 is activated to control to irradiate with the pulsed laser beam by one pulse from the irradiation unit 522. After that, the activation of the processing feed unit 37 is stopped to stop the movement of the chuck table 36. As a result as shown in FIG. 8B, the laser holes 204 are formed at the parts of the electrodes 203 (not shown in FIG. 8B).

As above, when the laser holes 204 are formed at the electrodes 203 formed at the device 202 of the row E1 of the workpiece 20, the controller (not shown) activates the processing feed unit 37 and the second indexing feed unit 43 to locate right under the irradiation unit 522 a coordinate value (a2) as the coordinate value of the location for starting the second processing feed stored in the memory for the electrodes 203 formed at the device 202 of the row E2 of the workpiece 20. Then the laser beam irradiating unit 52, the processing feed unit 37 and the second indexing feed unit 43 are controlled to perform the above-mentioned perforating step on the electrodes 203 formed at the device 202 of the row E2 of the workpiece 20. The perforating step is performed also on the electrodes 203 formed at the devices 202 of the rows E3-En of the workpiece 20. As a result, the laser holes 204 are formed at all electrodes 203 formed at the devices 202 of the workpiece 20.

When the perforating step is performed at this time under a predetermined processing condition, the laser holes 204 can be formed at the workpiece 20 with the depth of, for example, 5 μm. Therefore, when the thickness of the workpiece 20 is, for example, 50 μm, the via holes can be formed as through holes by the laser holes 204 at the electrodes 203, by repeating the perforating step 10 times. For this, it is necessary to preset the pulse number required to form a via hole based on the thickness of the workpiece 20 and on the depth of the laser holes 204 that can be formed at the workpiece 20 by the irradiation with the pulsed laser beam by one pulse. The perforating step is counted and repeated until the counted value reaches the pulse number required to form a via hole.

There is exemplified an example of processing condition applied to the perforating step as follows.

Laser oscillator 523: YVO4 or YAG
Wavelength of pulsed laser beam: 355 nm, 532 nm, 1064 nm
Output: 0.5 W to 50 W
Repetition frequency: 1 kHz to 200 kHz
Converging spot diameter: 5 μm to 200 μm
Processing feed rate: 10 mm/s to 1000 mm/s
Interval A of via holes: 50 μm to 1000 μm Next, there will be described the operation of the controller 10 for monitoring and controlling the operation of the laser beam irradiating unit 52 in the laser processing device 1 in this embodiment. In this embodiment as described above, the formation of the laser holes 204 is repeated more than once by the irradiation with the pulsed laser beam and the pulse number required to form a via hole is preset in the pulse number setting section 101 together with the timing thereof. The operation at the time of forming the laser holes 204 is monitored based on the settings.

In other words, the pulsed laser beam irradiation for forming the laser holes 204 for the electrodes 203 as described above is performed by outputting a pulse signal from the pulse signal output section 102 to the laser oscillator 523 according to the settings preset in the pulse number setting section 101 and by oscillating and outputting the pulsed laser beam by the laser oscillator 523. Thereby, in the state of normal operation, the laser oscillator 523 also oscillates and outputs the pulsed laser beam at the timing when the pulse signal output section 102 outputs the pulse signal. The photodetector 103 for monitoring by branching a part of the pulsed laser beam in the polarization beam splitter 525 also receives the beam to output to the pulsed laser beam detector 106 via the A/D converter 104. Accordingly, the pulsed laser beam detector 106 is also to detect the pulsed laser beam actually irradiated at the same timing.

When there is a failure of some kind in the laser beam irradiating unit 52 even if the pulse signal output section 102 outputs the pulse signal to the laser oscillator 523 so as to form a certain laser hole 204 and when, for example, the laser oscillator 523 does not oscillate and output the pulsed laser beam, the photodetector 103 for monitoring does not receive a part of the pulsed laser beam. Accordingly, the pulsed laser beam detector 106 cannot detect the pulsed laser beam at the timing of pulse signal output and the pulsed laser beam is not to be subject to the irradiation actually at the part where the laser hole 204 is formed.

Consequently, the first judgment section 107 always monitors whether the pulsed laser beam detector 106 detects the pulsed laser beam actually irradiated by the oscillation of the laser oscillator 523 at the timing when the pulse signal output from the pulse signal output section 102 is detected by the pulse signal detector 105. When the pulsed laser beam detector 106 cannot detect the pulsed laser beam at the timing, an abnormal signal is output to the check section 110. The abnormal signal in this case indicates that the pulsed laser beam irradiation omission is caused by the laser beam irradiating unit 52.

When there is a failure of some kind in the pulse signal output section 102 also in the controller 10 and the pulse signal output section 102 does not output the pulse signal actually to the laser oscillator 523 at the output timing of the pulse signal based on the preset value in the pulse number setting section 101, the laser oscillator 523 is not to oscillate and output the pulsed laser beam and the pulsed laser beam is not to be subject to the irradiation actually at the part where the laser hole 204 is formed.

Consequently, the second judgment section 108 always monitors according to the detection result in the pulse signal detector 105 whether the pulse signal output section 102 outputs the pulse signal actually to the laser oscillator 523 at the timing when the pulse signal is output based on the pulse number preset in the pulse number setting section 101. When the pulse signal detector 105 cannot detect the pulse signal output at the timing, an abnormal signal is output to the check section 110. The abnormal signal in this case indicates that the pulsed laser beam irradiation omission is caused by the controller 10 including the pulse signal output section 102.

The check section 110 recognizes that there occurs the failure of pulsed laser beam irradiation omission during the processing of the laser hole 204 under the pulsed laser beam irradiation when the abnormal signal is output from the first judgment section 107 or the second judgment section 108. The check section 110 also specifies the coordinate of the laser hole 204 where the failure of pulsed laser beam irradiation omission has occurred based on the X-axis and Y-axis coordinate values respectively output from the X-coordinate value output section 374c and the Y-coordinate value output section 383c at the time of the abnormal signal output to store the X-axis and Y-axis coordinate values in the coordinate storage 111. At this time, the type of abnormal signal is also stored in the coordinate storage 111 according to whether the abnormal signal is output from the first judgment section 107 or the second judgment section 108.

According to this embodiment as described above, the occurrence of failure is recognized when there occurs the failure of pulsed laser beam irradiation omission during the processing of the laser hole 204 under the pulsed laser beam irradiation. In addition, it can be recognized whether the failure is caused by the laser beam irradiating unit 52 or the controller 10 including the pulse signal output section 102. When there is a failure of such a pulsed laser beam irradiation, the X-axis and Y-axis coordinate values where the failure has occurred in the workpiece 20 are stored in the coordinate storage 111. Accordingly, the reprocessing of the laser holes 204 can be facilitated such as irradiating with shortfall pulsed laser beam again by locating the processing position at the position of the X-axis and Y-axis coordinate values with the failure (the position of electrodes 203) to avoid the damage of the workpiece 20.

Even when the laser beam irradiating unit 52 actually irradiates the workpiece 20 with the pulsed laser beam for forming the laser holes 204 in response to the pulse signal based on the pulse number preset in the pulse number setting section 101, the level of pulse energy of the pulsed laser beam is monitored through the photodetector 103 and the A/D converter 104 and the output judgment section 109 always monitors whether the level of the irradiated pulsed laser beam falls within the predetermined range or not. When the pulsed laser beam irradiated to form a certain laser hole 204 has the pulse energy which is too large that exceeds the predetermined upper limit THH, the output judgment section 109 outputs an abnormal signal indicating the failure of output to the check section 110. To the contrary, when the pulsed laser beam irradiated to form a certain laser hole 204 has the pulse energy which is too small below the predetermined lower limit THL, the output judgment section 109 outputs an abnormal signal indicating the failure of output to the check section 110 as well.

The check section 110 recognizes that there occurs the failure of pulsed laser beam output during the machining of the laser hole 204 under the pulsed laser beam irradiation when the abnormal signal is output from the output judgment section 109. The check section 110 also specifies the coordinate of the laser hole 204 where the failure of output has occurred based on the X-axis and Y-axis coordinate values respectively output from the X-coordinate value output section 374c and the Y-coordinate value output section 383c at the time of the abnormal signal output to store the X-axis and Y-axis coordinate values in the coordinate storage 111. At this time, the type of abnormal signal of the output failure is also stored in the coordinate storage 111.

According to this embodiment as described above, since a part of the pulsed laser beam actually irradiated to the workpiece 20 is monitored by the photodetector 103 to be judged in the output judgment section 109 the level of the pulse energy falls within the predetermined range or not, the occurrence of failure of pulsed laser beam irradiation can be recognized. With regard to the output failure, which occurs continuously in many cases, when, for example, there occurs a fatal failure where the pulse energy of the pulsed laser beam is too large that exceeds the predetermined upper limit THH, it is possible to minimize the damage of the workpiece 20 by stopping the following laser processing. When there occurs a failure where the pulse energy of the pulsed laser beam is too small below the predetermined lower limit THL, the X-axis and Y-axis coordinate values where the failure has occurred are stored in the coordinate storage 111. Accordingly, the reprocessing of the laser holes 204 can be facilitated such as irradiating the position with the failure (the position of electrodes 203) with shortfall pulsed laser beam again to avoid the damage of the workpiece 20.

In this embodiment, although there has been described an example of applying to the laser processing device 1 for forming a via hole by irradiating the electrodes 203 of the device 20 with a pulsed laser beam, it is applicable to various laser processing devices for performing machining by irradiating a workpiece with a pulsed laser beam as well as those for forming a via hole. For example, as disclosed in JP-A-2003-320466, there is applicable to a laser processing device for removing a low-dielectric-constant insulating film (Low-k film) laminated on predetermined division lines by irradiating the predetermined division lines of wafer with a pulsed laser beam. A low-dielectric-constant insulating film (Low-k film) can be exemplified by: an inorganic film such as SiOF, BSG (SiOB) and H-containing polysiloxane (HSQ); an organic film as a polymer film such as polyimide series, parylene series and polytetrafluoroethylene series; and a porous silica film such as methyl-containing polysiloxane. In such a laser processing device, when the level of the pulse energy of the pulsed laser beam irradiated to the low-dielectric-constant insulating film (Low-k film) exceeds a predetermined level, the damage on the low-dielectric-constant insulating film (Low-k film) becomes fatal. Accordingly, when the abnormal signal is generated according to the judging result in the output judgment section, It is advantageous that the damage on the workpiece is minimized by stopping the following processing immediately.

In addition, as disclosed in JP-A-6-120334, it is applicable to a laser processing device forming division grooves along predetermined division lines by irradiating the predetermined division lines of wafer with a pulsed laser beam. As disclosed in JP-A-2002-192367, it is also applicable to a laser processing device forming affected layers inside the predetermined division lines by irradiating the wafer with a pulsed laser beam having a wavelength with optical transparency. In these laser processing devices, a division grooves and affected layers can be formed to be continuous each other or formed by reprocessing and a wafer can be properly divided.

Also in this embodiment, although there are provided the first indexing feed unit 38 and the second indexing feed unit 43 and both the chuck table 36 and the laser beam irradiation unit support mechanism 4 (laser beam irradiating unit 52) can be moved in the Y-axis direction as the indexing feed direction, it is only necessary for the chuck table 36 and the laser beam irradiation unit support mechanism 4 to be moved relatively to each other. For example, the laser beam irradiation unit support mechanism 4 (laser beam irradiating unit 52) may be provided with the location thereof fixed on the stationary base 2 by omitting the second indexing feed unit 43 while only the chuck table 36 is configured to be capable of being subject to indexing feed by the first indexing feed unit 38. In this case, the second Y-axis reading head 433b may be omitted to provide only the first Y-axis reading head 383b.

What is claimed is:

1. A laser processing device comprising:
   a chuck table for holding a workpiece;
   a laser beam irradiating unit for irradiating the workpiece held on said chuck table with a pulsed laser beam, said laser beam irradiating unit including a laser oscillator, and including an irradiation unit for irradiating the workpiece with the pulsed laser beam oscillated by said laser oscillator;
   a controller for controlling said laser beam irradiating unit;
   a processing feed unit for moving said chuck table in an X-axis direction, and for outputting X-axis coordinate values of said chuck table; and
   an indexing feed unit for relatively moving said chuck table and said laser beam irradiating unit in a Y-axis direction, and for outputting Y-axis coordinate values based on a location of said chuck table and said laser beam irradiating unit,
   wherein said controller includes
       a pulse number setting section for setting a pulse number,
       a pulse signal output section for outputting a pulse signal to said laser oscillator according to the pulse number set in said pulse number setting section,
       a pulse signal detector for detecting the pulse signal output from said pulse signal output section, and for detecting a timing of the pulse signal,
       a pulsed laser beam detector for detecting the pulsed laser beam by branching a part of the pulsed laser beam such that the part of the pulsed laser beam is received by a photodetector, and for detecting a timing of the pulsed laser beam,
       a first judgment section for judging when the timing of the pulse signal detected by said pulse signal detector and the timing of the pulsed laser beam detected by said pulsed laser beam detector match each other after comparing the timings, and for outputting an abnormal signal in the case of not matching, and
       a second judgment section for judging when a timing based on a value of the pulse number set by said pulse number setting section and the timing of the pulse signal detected by said pulse signal detector match each other after comparing the timings, and for outputting an abnormal signal in the case of not matching.

2. The laser processing device according to claim 1, wherein said controller further includes an output judgment section for judging when an output of the pulsed laser beam falls within a predetermined level by detecting the pulsed laser beam after branching the part of the pulsed laser beam, and for outputting an abnormal signal in the case of not falling within the predetermined level.

3. The laser processing device according to claim 2, wherein said processing feed unit includes an X-coordinate value output section for outputting the X-axis coordinate value,
   wherein said indexing feed unit includes a Y-coordinate value output section for outputting the Y-axis coordinate value, and
   wherein said controller further includes a coordinate storage for storing an X-coordinate value and a Y-coordinate value of the workpiece upon an output of an abnormal signal by checking: (i) the X-axis coordinate value output from said X-coordinate value output section by said processing feed unit, (ii) the Y-axis coordinate value output from said Y-coordinate value output section by said indexing feed unit, (iii) the abnormal signal output from said first judgment section, (iv) the abnormal signal output from said second judgment section, and (v) the abnormal signal output from said output judgment section.

4. The laser processing device according to claim 2, wherein said processing feed unit includes an X-coordinate value output section for outputting the X-axis coordinate value,
wherein said indexing feed unit includes a Y-coordinate value output section for outputting the Y-axis coordinate value, and
wherein said controller further includes a coordinate storage for storing an X-coordinate value and a Y-coordinate value of the workpiece upon an output of an abnormal signal from one of said first judgment section, said second judgment section, and said output judgment section.

5. A laser processing device comprising:
a chuck table for holding a workpiece;
a laser beam irradiating unit for irradiating the workpiece held on said chuck table with a pulsed laser beam, said laser beam irradiating unit including a laser oscillator, and including an irradiation unit for irradiating the workpiece with the pulsed laser beam oscillated by said laser oscillator;
a controller for controlling said laser beam irradiating unit;
a processing feed unit for moving said chuck table in an X-axis direction, and for outputting X-axis coordinate values of said chuck table; and
an indexing feed unit for relatively moving said chuck table and said laser beam irradiating unit in a Y-axis direction, and for outputting Y-axis coordinate values based on a location of said chuck table and said laser beam irradiating unit,
wherein said controller includes
a pulse number setting section for setting a pulse number,
a pulse signal output section for outputting a pulse signal to said laser oscillator according to the pulse number set in said pulse number setting section,
a pulse signal detector for detecting the pulse signal output from said pulse signal output section, and for detecting a timing of the pulse signal,
a pulsed laser beam detector for detecting the pulsed laser beam by branching a part of the pulsed laser beam such that the part of the pulsed laser beam is received by a photodetector, and for detecting a timing of the pulsed laser beam,
a first judgment means for judging when the timing of the pulse signal detected by said pulse signal detector and the timing of the pulsed laser beam detected by said pulsed laser beam detector match each other after comparing the timings, and for outputting an abnormal signal in the case of not matching, and
a second judgment means for judging when a timing based on a value of the pulse number set by said pulse number setting section and the timing of the pulse signal detected by said pulse signal detector match each other after comparing the timings, and for outputting an abnormal signal in the case of not matching.

6. The laser processing device according to claim 5, wherein said controller further includes an output judgment means for judging when an output of the pulsed laser beam falls within a predetermined level by detecting the pulsed laser beam after branching the part of the pulsed laser beam, and for outputting an abnormal signal in the case of not falling within the predetermined level.

7. The laser processing device according to claim 6, wherein said processing feed unit includes an X-coordinate value output section for outputting the X-axis coordinate value,
wherein said indexing feed unit includes a Y-coordinate value output section for outputting the Y-axis coordinate value, and
wherein said controller further includes a coordinate storage for storing an X-coordinate value and a Y-coordinate value of the workpiece upon an output of an abnormal signal by checking: (i) the X-axis coordinate value output from said X-coordinate value output section by said processing feed unit, (ii) the Y-axis coordinate value output from said Y-coordinate value output section by said indexing feed unit, (iii) the abnormal signal output from said first judgment means, (iv) the abnormal signal output from said second judgment means, and (v) the abnormal signal output from said output judgment means.

8. The laser processing device according to claim 6, wherein said processing feed unit includes an X-coordinate value output section for outputting the X-axis coordinate value,
wherein said indexing feed unit includes a Y-coordinate value output section for outputting the Y-axis coordinate value, and
wherein said controller further includes a coordinate storage for storing an X-coordinate value and a Y-coordinate value of the workpiece upon an output of an abnormal signal from one of said first judgment means, said second judgment means, and said output judgment means.

* * * * *